(12) United States Patent
Da Silva et al.

(10) Patent No.: US 8,364,401 B2
(45) Date of Patent: Jan. 29, 2013

(54) HIGHLY INTEGRATED GPS, GALILEO AND INERTIAL NAVIGATION SYSTEM

(75) Inventors: Pedro Dias Freire Da Silva, Lisbon (PT); João Simões Silva, Lisbon (PT); Augusto Caramagno, Lisbon (PT); Antonio Fernandez Ortiz-Repiso, Tres Cantos (ES); Jose Diez Secadas, Tres Cantos (ES); Ismael Colomina, Catelldefels (ES)

(73) Assignees: Deimos Engenharia S.A., Lisbon (PT); Instituto de Geomatica, Castelldefels (ES)

( * ) Notice: Subject to any disclaimer, the term of this patent is extended or adjusted under 35 U.S.C. 154(b) by 606 days.

(21) Appl. No.: 12/602,260

(22) PCT Filed: May 29, 2007

(86) PCT No.: PCT/PT2007/000021
§ 371 (c)(1),
(2), (4) Date: Mar. 3, 2010

(87) PCT Pub. No.: WO2008/147232
PCT Pub. Date: Dec. 4, 2008

(65) Prior Publication Data
US 2010/0211316 A1    Aug. 19, 2010

(51) Int. Cl.
*G01C 21/10* (2006.01)
(52) U.S. Cl. ........ 701/473; 701/400; 701/412; 701/466; 701/469; 701/470; 701/471; 701/472; 701/476; 701/478.5; 701/500; 701/501; 701/502
(58) Field of Classification Search .......... 701/400–541; 342/29–40, 52–58, 61–65, 73–164
See application file for complete search history.

(56) References Cited

U.S. PATENT DOCUMENTS

| 6,229,478 B1 | 5/2001 | Biacs et al. |
| 2001/0020216 A1 | 9/2001 | Lin |

(Continued)

OTHER PUBLICATIONS

Silva, Pedro F. et al., "Iadira: Inertial Aided Deeply Integrated Receiver Architecture", ION GNSS 19th International Technical Meeting, pp. 2686-2694, XP002468512, Fort Worth, Texas, Sep. 26, 2006.

Alban, Santiago et al., "Performance Analysis and Architectures for INS-Aided GPS Tracking Loops", Proceedings of the 2003 National Technical Meeting of the Institute of Navigation, pp. 611-622, XP002468513, Anaheim, California, Jan. 22, 2003.

*Primary Examiner* — Khoi Tran
*Assistant Examiner* — Bhavesh V Amin
(74) *Attorney, Agent, or Firm* — Pearl Cohen Zedek Latzer, LLP

(57) ABSTRACT

The navigation system described here utilizes GPS and Galileo satellite signals combined with Inertial Navigation Systems (INS), where a Coupled Antenna (CAN) provides both GNSS and Inertial Measurement Unit (IMU) data to a Highly Integrated GNSS-Inertial (Hi-Gi) receiver. Such receiver makes use of a high fidelity relation between GNSS unprocessed Correlator Output (COUT) I and Q data and the user trajectory, and inertial sensor data, which in turn are combined within a Kalman Filter (KF). The KF determines the navigation solution that is also used to provide feedback to the receiver demodulation signal processing stage, thus eliminating the need of dedicated structures such as Delayed Locked Loops (DLL) and Phase Locked Loops (PLL), allowing a significant improvement in navigation performance. The improvement allows this system to provide high quality measurements and operate in circumstances where usual techniques are not usable; for example during satellite signal interruption due to obstruction, or in very high dynamics or even in attenuated signal environments, due to, for example, the canopy of trees. The KF also makes use of particular Galileo signal characteristics, lock detectors and Coupled Antenna that allow the system to operate in such environments.

11 Claims, 1 Drawing Sheet

U.S. PATENT DOCUMENTS

2006/0071851 A1 4/2006 Graas et al.
2006/0161329 A1 7/2006 Crane et al.

OTHER PUBLICATIONS

International Search Report for International Patent Application No. PCT/PT2007/000021 dated Feb. 21, 2008.

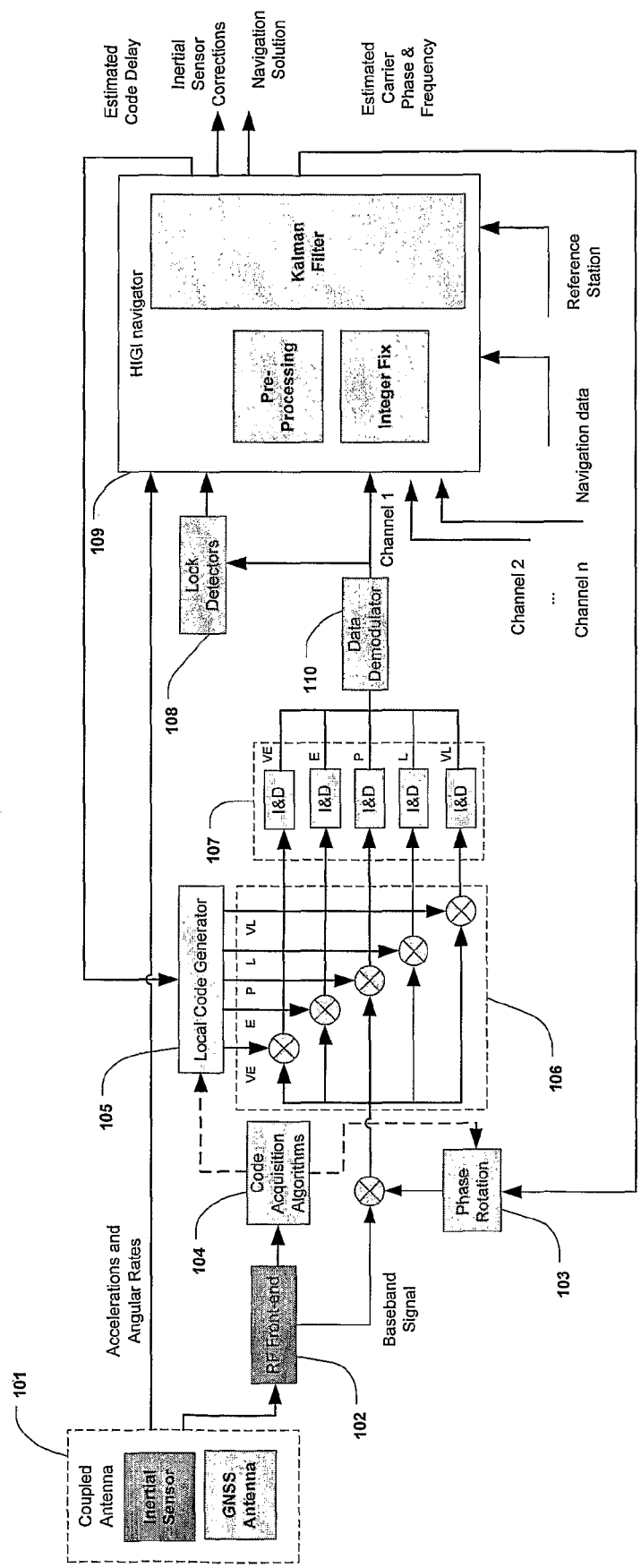

HIGHLY INTEGRATED GPS, GALILEO AND INERTIAL NAVIGATION SYSTEM

TECHNICAL FIELD

The following description refers to navigation systems in general and more specifically Global Navigation Satellite Systems using GPS and Galileo that are integrated with INS to provide enhanced navigation and ability to navigate in low signal strength, high dynamics or in other GNSS or INS harsh conditions.

BACKGROUND

GPS is classified as a GNSS (Global Navigation Satellite System) that has reached fully operational capability in 1995, and is developed by the United States Department of Defense. GPS is widely used today as a system that allows navigation in a myriad of domains, from space, aeronautics to maritime. It is also widely used in other applications such as map-making, land-surveying, time reference keeping and serves different communities such as the military, commercial and scientific.

Galileo is a European GNSS planed to be operational in 2012. It is being developed by the European Union and the European Space Agency. Galileo will introduce new signals with distinct characteristics of GPS and will provide a higher precision than is currently available with GPS. New signals will include a pilot tone signal, which has no navigation data modulation.

GPS and Galileo operate using the same principle: the receiver determines its position using distance measurements between itself and visible satellites. This is achieved by measuring the time elapsed between satellite transmission and receiver reception, and also by demodulating the received signal that contains the satellite position data, also known as ephemeris. Once the measurements are obtained and the navigation message demodulated, the user position is easily determined by solving a set of non-linear equations, where the number of unknowns are the three coordinates. Since the receiver does not have a perfectly accurate clock, besides three satellites for determination of three coordinates, an additional satellite measurement in needed. Furthermore, since the signals transmitted by the satellites are affected by propagation delays, such as due to ionosphere, additional algorithms are required by the receiver to correct the performed measurements.

GPS and Galileo signals are considerably weak when they arrive at the receiver. Furthermore such signals can be easily obstructed, for example due to a tall building, or can be attenuated due to, for example, the canopy of trees. This results in the inability to determine a valid navigation solution. Furthermore, when the dynamics between the satellite and user are very high and if no external aiding is used, an additional error may distort the navigation solution, usually termed dynamic stress error.

INS consists of an IMU (Inertial Measurement Unit) that is combined with a set of algorithms that provide the position, velocity and attitude of a platform by measuring the linear and angular accelerations applied to the system in an inertial reference frame. INS is widely used in navigation systems such as in aircraft, as it is immune to interference and offers a reliable an independent means for navigation. INS requires periodic calibration and maintenance at a period that typically depends on the quality and cost of the sensors. In some cases, using low cost sensors, the calibration is required every second to avoid excessive drifting.

To overcome individual INS and GNSS problems as those mentioned before, a widely used technique consists in integrating INS with GNSS, where each of the systems complement each other. In a prior art system, an additional technique consists in increasing the integration times of GNSS signals so that, during the integration, the navigation solution is provided by the INS. Increasing the integration time of GNSS signals is a usual technique employed in GNSS signal tracking to allow detection of weaker signals, but results in decreased sensibility due to dynamics unless external aid is available from, for example, the INS. Another limitation of long integrations is that its duration is limited to the navigation data period of GNSS signals. With Galileo pilot tone signal, since no navigation data is modulated, this will not be a problem but attention is still required not to loose required sensibility due to dynamics.

Different techniques can be used to integrate GNSS and INS, using different levels of integration, ranging from uncoupled, loosely coupled, tightly coupled to ultra-tightly coupled. Recent attempts to use ultra-tight integration between GNSS and INS techniques rely on replacing the traditional tracking structures with a KF (Kalman Filter). This technique allows elimination of bandwidth limitations imposed by filters within the DLLs (Delayed Locked Loops) and PLLs (Phase Locked Loops). Furthermore it allows multi-satellite tracking, which permits more robust satellite tracking as one signal aids the other since the navigation and the tracking are now performed together. In the ultra-tight approach, the combined GNSS-INS system provides the necessary feedback to aid the code and carrier phase tracking. Tracking of these components consists in aligning the incoming signal's code and carrier phase with the local generated replica in a permanent feedback and correction mechanism, requiring the use of code and carrier phase discriminators that provide an estimate of the error.

The bandwidth limitation of the DLL and PLL can affect the quality of the navigation solution, principally if the receiver clock or the inertial aiding quality are not good, resulting in an additional error in real and imaginary components of a correlator output COUT, also termed the I and Q components. One prior art technique is to model clock and the just mentioned I and Q errors in the KF in a tight coupling or, using an ultra-tightly coupled architecture as exemplified in the patent with international publication number WO 2005/124278 A1. In this type of approach, the I and Q data is used and the filter bandwidth is no longer a system design parameter, but intrinsically determined by the KF at every update epoch of the KF. However, a series on non-linear transformations and assumptions of the I and Q data are required. In prior art systems, as described in the United States patent with publication number US 2006/0161329 A1 and publication number U.S. Pat. No. 7,151,486 B2, the I and Q data are modelled as functions of simple cosine and sine with given amplitudes and white Gaussian noise, and transformations of measured I and Q data using discriminators, that in turn are related with KF states assuming the above mentioned simplified model. This model and transformations result in approximations that deteriorate the navigation solution, therefore making more difficult to track the GNSS in harsh environments, such as when the signal strength is low; when the dynamics are high; when the quality of the aiding or the clock is degraded. In both U.S. Pat. No. 7,151,486 B2 and US 2006/0161329 A1 the tracking modules provide residuals resulting from the transformations to navigation filter modules and therefore the integration between the I and Q data and the inertial sensor is not performed in the same filter.

An additional limitation in prior art systems is the tracking of low strength GPS signals often resulting in false signal lock, degrading the navigation solution. This problem is typical in tight coupling, since very small PLL and DLL bandwidths and multi-satellite tracking allow operation in noisier scenarios. The same problem applies in ultra-tight coupling. Therefore, in both tight and ultra-tight coupling, special attention is required in order to provide optimal signal lock detection.

In other prior art systems, the GNSS antenna and the inertial sensor and receiver are physical separated from each other and from the receiver, and therefore when installed, such as in an aircraft, due to the vibrations and other small movements in the structure, additional processing effort is required to remove, smooth or estimate such variations, that can affect the quality of the tracking in the tight ultra-tight coupling.

SUMMARY

In this description, a GNSS-INS Highly Integrated receiver (Hi-Gi) receiver allows solving the shortcomings described before by using a high fidelity relation between the correlator outputs I and Q data and the user position and velocity, and, in this way, achieve enhanced navigation in terms of position and velocity accuracy and availability in difficult environments such as in low signal strength, in high dynamics and during GNSS signal interruption. Furthermore no discriminator is used for carrier phase tracking so that I and Q data are direct observables of the navigation filter together with the inertial sensor data, thus eliminating additional source of error and achieving high level of integration between the inertial and the GNSS sensors. To assist in achieving the enhanced navigation, an optimal lock detector is employed and the GNSS antenna and inertial sensor integrated in the same casing.

BRIEF DESCRIPTION OF THE DRAWING

The invention is now described in detail with the help of the annexed drawings, where the FIG. 1 depicts the architecture of the preferred embodiment of the invention.

DETAILED DESCRIPTION

The navigation system 100 comprises a hybrid sensor herein referred as Coupled Antenna (CAN) 101. This sensor comprises a GNSS antenna and inertial sensors IMU typically a MEMS (Micro-Electro-Mechanical System) and provides both GNSS Radio Frequency (RF) data and inertial (acceleration and/or angular velocities) data. This data is fed to the receiver RF Front-End (RF-FE) 102 and also to the Hi-Gi navigator 109.

The RF-FE 102 performs the acquisition and pre-processing of the signal transmitted by the satellite. This pre-processing includes, but is not limited to, the following functions: signal filtering, down-conversion to Intermediate Frequency (IF), Analog-to-Digital conversion (ADC) (including sampling, quantisation and Automatic Gain control (AGC)) and, optionally, down-conversion to baseband (BB). The AGC keeps the amplitude of the incoming signal constant, since it changes in time, amongst others factors, due to satellite movement.

The navigation system 100 is furthermore comprised by various channels, each allocated to a different satellite and signal frequency, having as inputs the RF-FE 102 data. Each channel comprises the following modules: code acquisition 104, phase rotation 103, multipliers 106, local code generators 105, Integrate and Dump (I&D) 107, lock detectors 108 and navigation data demodulator 110. The multipliers, the local code generator and the I&D form the so called Correlator Output (COUT) that consists of I and Q data. When the locally generated replicas of the code and phase are correctly aligned with the incoming signal, the I and Q data will reflect such high correlation. Several replicas of the local code are used, namely the Very-Early (VE), Early (E), Prompt (P), Late (L) and Very-Late (VL), corresponding to different code delays and resulting in different COUT signals.

Furthermore, the navigation system 100 also comprises the Hi-Gi navigator 109 that receives the inertial sensor data from the CAN Coupled Antenna 101 as well as the I and Q output data, and outputs the navigation solution, inertial sensors corrections, estimated code delay and estimated carrier phase and frequency. The estimated code delay and carrier phase and frequency outputs of the navigator 109 are communicated to the phase rotation 103 and local code generator 105, respectively. This communication provides a feedback mechanism that allows controlling the error growth. The code delay and carrier phase and frequency are tracked simultaneously and for all channels in the KF using a high fidelity relation between the I and Q and the KF states. The KF states do not include the code delay, carrier phase or frequency measurement estimates themselves, nor their respective errors. Instead, the KF states include the position, velocity, attitude, clock bias and drift errors together with the inertial sensor misalignment, drift and bias, which are related to the actual code delay and carrier phase and frequency errors. In the case of the code delay tracking, the transformation includes normalisation and absolute values of the Early and Late I and Q measurements but in the case of the carrier phase no transformation is required and the KF uses directly the I and Q data.

The Hi-Gi also allows taking benefit from the steeper auto correlation function of Galileo signals, contributing to a more stable KF, thus aiding in achieving better performance in adverse conditions. Furthermore, the high fidelity model takes into account the integration time in the calculation of the correlation loss due to carrier frequency errors, which are particularly important for longer integration times (such as those allowed by Galileo pilot signals and assuming a linear phase during the integration period). Additionally, the KF of 109 uses satellite ephemeris from the navigation data to determine the satellites' position and velocity. In turn, these are used to determine the estimates of code delay and carrier phase and frequency, outputs of 109. The navigation data can be extracted from the COUT signals by the data demodulator 110 (if the signal being tracked is a data signal) or can be provided by an external source.

In the current description the traditional DLL and PLL structures are not present, although they can be implemented in parallel, and in this case, during receiver operation, a transition would occur between such more traditional structure and the Hi-Gi, as soon as the loops have converged and, in the case of a pilot channel, secondary code demodulation has been performed.

Within the Hi-Gi navigator 109, the pre-processor determines additional required corrections, such as ionospheric and tropospheric. Usually these errors, although not small, have slow variations in time. The integer fix function is required since, in some cases, the KF may momentarily be unable to correctly track the incoming signal, resulting in unwanted ambiguity that needs to be fixed to provide a correct navigation solution. This fix is aided with data from a reference station.

The lock detectors 108 are used to determine if an interruption of the GNSS signal at the receiver has occurred and, in that case, communicate such event to the KF. Such detectors are of outmost importance in the Hi-Gi receiver since they prevent the KF from using data that would corrupt the navigation solution. Once such event is detected, the KF of 109 keeps communication with the local code generator 105, so that when the outage has finished the re-acquisition can be instantaneous.

The navigation system 100 also comprises a data demodulator 110 module that is responsible for extracting the navigation data modulated in the incoming GNSS signals.

The acquisition module 104 is responsible for code acquisition of the GNSS signal and providing first estimates to start tracking the signals for both the local code generator 105 and to the phase rotation 103.

The phase rotation 103, multipliers 106, I&D 107, Lock Detectors 108 and data demodulator 110 modules are repeated for each channel which, in turn, is allocated to a different GNSS satellite or signal. The phase rotation 103 is implemented using an NCO (Numerically Control Oscillator) and is responsible for generating the local carrier replica based on the carrier phase and frequency estimates. Subsequently, the signal is despread by multiplying it by the local (Prompt) code replica and a slight delayed (Late, Very-Late) and advanced (Early, Very-Early) versions of it. These are subsequently passed through the I&D components 107 before they are used in the KF of 109. The outputs of the I&D blocks are the so called correlator output I and Q data, and are generated at a frequency defined by the integration period. When there is a GNSS signal interruption, the estimated code delay is still computed by the navigator and provided to the GNSS tracking stage using the before mentioned feedback mechanism, allowing to keep the internal code replica aligned for some amount of time. This allows skipping acquisition when signal interruption ends and tracking resumes.

The high fidelity model of the outputs of the correlator, before it is normalized, separates the contributions of the carrier and code Doppler and misalignment in five multiplicative factors and is given, for each integration number, n, as:

$$S_n \approx A_n D_n E_n R_n L_n + W_n, \text{ with}$$

$$A_n = \sqrt{10^{\frac{C/N_0}{10}} T_i},$$

$$D_n = \pm 1,$$

$$E_n = e^{j[(\phi_{i_n} - \omega_n t_n) - (\hat{\phi}_n - \hat{\omega}_n t_n)]} \frac{e^{j(\omega_n - \hat{\omega}_n)t_n} - e^{j(\omega_n - \hat{\omega}_n)(t_n + T_i)}}{1 - e^{j(\omega_n - \hat{\omega}_n)T_s}},$$

$$R_n = R(-\tau_n + (\hat{\tau}_n + \tau_{corr})),$$

$$L_n = 1 - 2\left(1 - \frac{1}{4K_{mod}}\right)\frac{1}{2}\left|1 - \frac{\chi_n}{\hat{\chi}_n}\right|\left(1 + K_{mod}\frac{T_i}{T_c}\right),$$

where:
- n is the integration number, defining the integration time range $[t_n, t_n+T_i[$ (where $t_n=(n-1)T_i$);
- $T_i$ is the integration period [s];
- $T_c$ is the chip time [s];
- $T_s$ is the pre-integration sampling period [s];
- $C/N_0$ is the Carrier-to-Noise Ratio [dB-Hz];
- $\tau_n$ is the code delay at time $t_n$ [s];
- $\hat{\tau}_n$ is the estimated code delay [s];
- $\phi_{i_n}$ is the carrier phase at the beginning of the n-th integration [rad];
- $\hat{\phi}_n$ is the carrier phase estimate [rad];
- $\omega_n$ is the average Doppler shift during the n-th integration [rad/s] and $\omega_n = \omega|_{t=t_n}$ [rad/s];
- $\hat{\omega}_n$ is the Doppler shift estimate [rad/s] and $\hat{\omega}_n = \hat{\omega}|_{t=t_n}$ [rad/s];
- $R(\cdot)$ is the autocorrelation function of the GNSS signal for a given delay;
- $\tau_{corr}$ is zero for the Prompt correlator and $\tau_{corr} = \mp d/2$ for the Early and Late correlators, with d being the Early-Late correlator spacing [s] (in the case of Galileo BOC signals two extra correlators are used, as mentioned before, and their spacing is such that, when the Prompt correlator is on the main peak, the VE and VL correlators are positioned in the first secondary peaks, one at each side of the main peak);
- $K_{mod}$ is a constant dependent on the modulation: $K_{mod}=\frac{1}{2}$ for BPSK modulations and $K_{mod}=n/m$ for BOC(n,m) modulations (which is the number of subcarrier periods in one code chip);
- $\chi$ is the time expansion factor given by $$\chi = \chi(\omega) = \frac{1}{1 + \frac{\omega}{\omega_0}};$$

- $\hat{\chi}$ is the assumed (or estimated, if updated throughout the tracking phase) time expansion factors given by $$\hat{\chi} = \chi(\hat{\omega}) = \frac{1}{1 + \frac{\hat{\omega}}{\omega_0}},$$

respectively;
- $\omega_0$ is the RF carrier frequency [Hz];
- $W_n$ is the n-th realisation of a Gaussian random variable with zero mean and variance $N=T_i/T_s$ (which is the number of samples in one integration period).

The $A_n$ factor accounts for the maximum amplitude of the correlator output for a given $C/N_0$ assuming unit noise power before correlation, the $D_n$ factor is the data symbol and the $W_n$ is the post-correlation noise. The remaining factors account for correlation losses due to carrier phase and frequency errors ($E_n$ factor), code delay error ($R_n$) and code Doppler ($L_n$).

Note that this model assumes that the local carrier replica is generated according to $$\hat{\Phi}_n(t) = \hat{\phi}_n + \hat{\omega}_n(t - t_n)$$

and the incoming signal's carrier phase can be approximated by a piecewise linear phase defined as $$\phi_n(t) = \phi_{i_n} + \omega_n(t - t_n),$$

where $$\omega_n = \frac{\phi_{i_{n+1}} - \phi_{i_n}}{NT_s}$$

is the average Doppler frequency during the n-th integration.

The term $E_n$ can be re-written as a function of carrier phase and frequency errors:

$$E_n = e^{j[(\psi-\eta(n-1)T_i)]}\frac{e^{j\eta(n-1)T_i} - e^{j\eta nT_i}}{1 - e^{j\eta T_s}}$$

The phase error is the difference between the estimated phase and incoming phase:

$$\psi = \phi_{i_n} - \hat{\phi}_n$$

The frequency error is the difference between the estimated and incoming carrier frequency:

$$\eta = \overline{\omega}_{i_n} - \hat{\overline{\omega}}_n$$

Given the relation between the phase and the satellite-user range (assuming constant Doppler during the integration period and $\overline{\omega}_0 = 2\pi f_0$ where $f_0$ is the RF carrier frequency and $N_a$ the unknown ambiguity in the carrier phase and c the speed of light):

$$\phi = -\frac{\varpi_0}{c}\rho + N_a$$

$$\hat{\phi} = -\frac{\varpi_0}{c}\hat{\rho} + \hat{N}_a$$

where the estimated satellite-user distance is:

$$\hat{\rho} = \sqrt{(X-\hat{x})^2 + (Y-\hat{y})^2 + (Z-\hat{z})^2}$$

In this description the receiver clock, ionospheric, tropospheric and GNSS satellite clock errors has been omitted for representation simplicity but should be considered in the realisation as these can be simply obtained from the navigation data.

The true satellite-user distance is assumed to be:

$$\rho = \sqrt{(X-(\hat{x}+\Delta x))^2 + (Y-(\hat{y}+\Delta y))^2 + (Z-(\hat{z}+\Delta z))^2}$$

where the X, Y and Z is the satellite position in ECEF coordinates, and x, y and z the receiver position in the same coordinate system.

Given the relation between the frequency and the range rate:

$$\varpi = \varpi_0 \frac{\dot{\rho}}{c}, \quad \hat{\varpi} = \varpi_0 \frac{\hat{\dot{\rho}}}{c}$$

where the estimated satellite-user range-rate is:

$$\hat{\dot{\rho}} = -\frac{\varpi_0}{c\hat{\rho}}\left[(\hat{x}-X)(\hat{\dot{x}}-\dot{X}) + (\hat{y}-Y)(\hat{\dot{y}}-\dot{Y}) + (\hat{z}-Z)(\hat{\dot{z}}-\dot{Z})\right]$$

and the true satellite-user range rate assumed to be:

$$\dot{\rho} = -\frac{\varpi_0}{c\rho}\begin{bmatrix}((\hat{x}+\Delta x)-X)((\hat{\dot{x}}+\Delta \dot{x})-\dot{X}) + \\ ((\hat{y}+\Delta y)-Y)((\hat{\dot{y}}+\Delta \dot{y})-\dot{Y}) + \\ ((\hat{z}+\Delta z)-Z)((\hat{\dot{x}}+\Delta \dot{x})-\dot{Z})\end{bmatrix}$$

It is now possible to relate the receiver frequency and carrier phase errors with the receiver velocity and position. In the Hi-Gi navigator, the KF will track also the code errors. The code error is defined to be the difference between the estimated code and incoming code, in seconds:

$$\zeta = \rho - \hat{\tau}$$

Given the relation between the code with the satellite-user range:

$$\rho - \hat{\rho} = c(\tau - \hat{\tau})$$

The KF uses the correlator output Early and Late signals that are related with code error $\zeta$ that in turn is related with the position error and the Early-Late correlator spacing:

$$|R_{n_E}| - |R_{n_L}| = \left|R\left(-\zeta + \frac{d}{2}\right)\right| - \left|R\left(-\zeta - \frac{d}{2}\right)\right|$$

For tracking of the code, the I and Q measurement is transformed before it is used in the KF, so that it can be related to the model while for tracking the phase they are directly used without any transformation. The I and Q measurements correspond to the real and imaginary part of the normalised COUT after navigation data extraction, that is the real and imaginary part of $$\frac{S'_n}{|S'_n|}$$

where $S'_n$ is the measured COUT, so that each channel input of 109 corresponds to three different measurements of the KF: the Prompt $I_P$, $Q_P$ and the difference $|I_E+Q_E| - |I_L+Q_L|$.

The measurement equation of the KF is $z_k = H_k x_k + v_k$ where $H_k$ is the Jacobian matrix, that uses the high fidelity model, evaluated at each filter iteration k, and where $x_k$ is the state vector and $v_k$ the white Gaussian noise. The state vector comprises position, velocity, attitude, and clock errors and inertial sensor errors such as misalignment, bias and scale factor.

The KF generates an internal prediction of the $I_P$, $Q_P$ and $|I_E+Q_E| - |I_L+Q_L|$ using internal estimates of the position and velocity, which are used to perform the linearization. The partial derivatives of H are then determined, so that the different elements of H can be written, as an example, for the carrier phase and frequency error and along the x direction, in the following partial derivative decomposition and using the correlator model and also assuming that normalisation eliminates amplitude components leaving only the term $E_n$:

$$\frac{\partial E}{\partial \Delta x} = \frac{\partial E}{\partial \psi} \frac{\partial \psi}{\partial \Delta x}$$

$$\frac{\partial E}{\partial \Delta \dot{x}} = \frac{\partial E}{\partial \eta} \frac{\partial \eta}{\partial \Delta \dot{x}}$$

and for the code, along the x direction:

$$\frac{\partial(|R_E| - |R_L|)}{\partial \Delta x} = \frac{\partial(|R_E| - |R_L|)}{\partial \zeta} \frac{\partial \zeta}{\partial \Delta x}$$

The derivatives of the code and phase errors previously mentioned are obtained using the expressions given next. The internal estimates of the carrier phase, frequency and code are used to control the error growth of the KF as explained next.

First, these are predicted at every filter iteration using the best estimate available of the position and velocity and therefore, in the determination of the estimates of code, phase and frequency required in the feedback tracking process, the satellite-user range and range rate is given for every iteration k using position and velocity of epoch k−1:

$$\hat{\rho}_k = \sqrt{(x_k - \hat{x}_{k-1})^2 + (Y_k - \hat{y}_{k-1})^2 + (Z_k - \hat{z}_{k-1})^2}$$

$$= \hat{\phi}_k = -\frac{\varpi_0}{c}\hat{\rho}_k$$

$$= -\frac{\varpi_0}{c}\sqrt{(X_k - \hat{x}_{k-1})^2 + (Y_k - \hat{y}_{k-1})^2 + (Z_k - \hat{z}_{k-1})^2}$$

$$\hat{\varpi}_k = \frac{\varpi_0}{c}\hat{\dot{\rho}}_k$$

$$= \frac{\varpi_0}{c}\frac{1}{\hat{\rho}_k}\begin{bmatrix}(\hat{x}_{k-1} - X_k)(\hat{\dot{x}}_{k-1} - \dot{X}_k) + \\ (\hat{y}_{k-1} - Y_k)(\hat{\dot{y}}_{k-1} - \dot{Y}_k) + \\ (\hat{z}_{k-1} - Z_k)(\hat{\dot{z}}_{k-1} - \dot{Z}_k)\end{bmatrix}$$

For the determination of the code, carrier and frequency errors, the following is used:

$$\tau - \hat{\tau} = \frac{1}{c}\left[\sqrt{\begin{matrix}(X_k - (\hat{x}_{k-1} + \Delta x_{k-1}))^2 + \\ (Y_k - (\hat{y}_{k-1} + \Delta y_{k-1}))^2 + \\ (Z_k - (\hat{z}_{k-1} + \Delta z_{k-1}))^2\end{matrix}} - \hat{\rho}_k\right]$$

$$\phi_k - \hat{\phi}_k - = -\frac{\varpi_0}{c}\sqrt{\begin{matrix}(X_k - (\hat{x}_{k-1} + \Delta\hat{x}_{k-1}))^2 + \\ (Y_k - (\hat{y}_{k-1} + \Delta\hat{y}_{k-1}))^2 + \\ (Z_k - (\hat{z}_{k-1} + \Delta\hat{y}_{k-1}))^2\end{matrix}} - \hat{\phi}_k$$

$$\varpi_k - \hat{\varpi}_k = \frac{\varpi_0}{c}\frac{1}{\hat{\rho}_k}\begin{bmatrix}((\hat{x}_{k-1} + \Delta\hat{x}_{k-1}) - X_k) \\ ((\hat{\dot{x}}_{k-1} + \Delta\hat{\dot{x}}_{k-1}) - \dot{X}_k) + \\ ((\hat{y}_{k-1} + \Delta\hat{y}_{k-1}) - Y_k) \\ ((\hat{\dot{y}}_{k-1} + \Delta\hat{\dot{y}}_{k-1}) - \dot{Y}_k) + \\ (\hat{z}_{k-1} + \Delta\hat{z}_{k-1}) - Z_k) \\ ((\hat{\dot{z}}_{k-1} + \Delta\hat{\dot{z}}_{k-1}) - \dot{Z}_k)\end{bmatrix} - \hat{\varpi}$$

Using the internal estimates for tracking the carrier phase and frequency, the KF will minimise the amounts:

$$Re\left\{\frac{S'_n}{|S'_n|}\right\} - Re\left\{\frac{\hat{E}_n}{|\hat{E}_n|}\right\}$$

$$Im\left\{\frac{S'_n}{|S'_n|}\right\} - Im\left\{\frac{\hat{E}_n}{|\hat{E}_n|}\right\}$$

and for the code:

$$\left(\left|\frac{S'_{n_E}}{S'_{n_P}}\right| - \left|\frac{S'_{n_L}}{S'_{n_P}}\right|\right) - (|\hat{R}_{n_E}| - |\hat{R}_{n_L}|) \text{ where}$$

$$\hat{E}_n = e^{j[(\hat{\psi} - \hat{\eta}(n-1)T_i)]}\frac{e^{j\hat{\eta}(n-1)T_i} - e^{j\hat{\eta}nT_i}}{1 - e^{j\hat{\eta}T_s}}$$

$$\hat{R}_{n_E} = R(\hat{\zeta} + d)$$

-continued $$\hat{R}_{n_L} = R(\hat{\zeta} - d)$$

$$\hat{\psi} = \phi_k - \hat{\phi}_k$$

$$\hat{\eta} = \varpi_k - \hat{\varpi}_k$$

Both the phase and the frequency estimates are used to generate the local carrier replica by the NCO: its phase varies linearly with time during each integration period, its initial value is the actual phase estimate and the rate of change is the frequency estimate.

Furthermore, the effect of $L_n$ is not necessary to be considered for the carrier phase since it affects only the amplitude and also not used in the code since the Early and Late samples are taken at the same time. Additionally, the description provided here is sufficiently generic to apply to different GNSS signals such as GPS L1, or L2 or Galileo L1 or E5.

As to the remaining implementation of the KF, the process model and the state transition model is given by:

$$\dot{x} = f(x, \epsilon)$$

In more detail, the basic form of the navigation ordinary differential equations (ODE) in ECEF reference frame for solving position ($x^e$), velocities ($v^e$) and attitude angles (in form of Euler matrix $R_b^e$) is:

$$\dot{x}^e = v^e$$

$$\dot{v}^e = R_b^e(R_{wa}^b(1+S_a)(f^b + \omega_f - b_a)) - 2\Omega_{ie}^e v^e + g^e(x^e)$$

$$\dot{R}_b^e = R_b^e(\omega_{ei}^b + \omega^e(R_{wo}^b(1+S_o)(\omega_{ib}^b + \omega_w - b_o)))$$

$$\dot{b}_o = -\beta_b b_o + w_{b_o}$$

$$\dot{b}_a = -\alpha_b b_a + w_{b_a}$$

$$\dot{s}_o = -\beta_s s_o + w_{s_a}$$

$$\dot{s}_a = -\alpha_s s_a + w_{s_a}$$

$$\dot{m}_o = -\beta_m m_o + w_{m_o}$$

$$\dot{m}_a = -\alpha_m m_a + w_{m_a}$$

Where the accelerometers and gyroscopes observations ($f^b$ and $\Omega_{ib}^b$ respectively) are compensated with Earth rotation ($\Omega_{ci}^b$), Coriolis Effect ($-2\Omega_{ic}^e v^e$) and gravity ($g^e(x^e)$) effect terms.

The units used in the equations depend of the reference frame and coordinate system chosen for the processing. However, assuming an ECEF reference frame using a Cartesian coordinate system, for the position and velocity and standard angular units for the angles, the units user are as follows: meters (m) for the position, meters per second (m/s) for the velocity and radians (rad) for the attitude angles. It should be taken into account that the angles may be processed as quaternions or elements of an Euler matrix (unitless parameters). All the parameters related with specific forces (accelerometer observations, gravity and Coriolis Effect) are expressed in meters per squared second (m/s²) and the parameters related with turns (gyroscope observations and Earth rotation) are expressed in radians per second (rad/sec). In this case, the angular variations parameters are also processed as quaternions or elements of an Euler matrix.

The IMU calibration parameters are:
  $w_\omega$ is the gyroscope observation white noise (usually set as a spectral density as in [deg/sqrt(hr)] or [rad/sqrt(Hz)]);
  $w_f$ is the accelerometer observation white noise (usually set as a spectral density as [micro-g/sqrt(Hz)]);

$S_o$ is the gyroscope scale factor matrix (usually set as unit less parameters or in parts per million (ppm));

$S_a$ is the accelerometer scale factor matrix (usually set as unit less parameters or in ppm);

$R_{\omega o}{}^b$ is the gyroscope misalignment matrix [rad] or [micro-radians];

$R_{\omega a}{}^b$ is the accelerometer misalignment matrix [rad] or [micro-radians];

$b_o$ is the gyroscope bias vector [deg/hr] or [rad/sec], $w_{b_o}$ is the bias white noise [deg/hr] or [rad/sec] and $\beta_b$ are the coefficients of the self-calibration parameter SDE [inverse of correlation time in seconds or hours for a $1^{st}$ order Gauss-Markov (GM)];

$b_a$ is the accelerometer bias vector [micro-g] or [m/s²], $w_{b_a}$ is the bias white noise [micro-g] or [m/s²] and $\alpha_b$ are the coefficients of the self-calibration parameter SDE [inverse of correlation time in seconds or hours for a $1^{st}$ order GM];

$s_o$ is the gyroscope scale factor vector (unlit less or ppm), $w_{s_o}$ is the bias white noise and (unit less or ppm) $\beta_s$ are the coefficients of the self-calibration parameter SDE [inverse of correlation time in seconds or hours for a $1^{st}$ order GM];

$s_a$ is the accelerometer scale factor vector, $w_{s_a}$ is the bias white noise and $\alpha_s$ are the coefficients of the self-calibration parameter SDE (same units as for $s_o$);

$m_o$ is the gyroscope misalignment vector [rad] or [micro-rad], $w_{m_o}$ is the bias white noise [rad] or [micro-rad] and $\beta_m$ are the coefficients of the self-calibration parameter SDE [inverse of correlation time in seconds or hours for a $1^{st}$ order GM];

$m_a$ is the accelerometer misalignment vector, $w_{m_a}$ is the bias white noise and $\alpha_m$ are the coefficients of the self-calibration parameter SDE (same units as for $m_o$).

It has been assumed that the calibration parameters follow a first order GM stochastic model and that the clock bias rate is a constant (only estimated in the filtering).

On the other hand, the predicted errors are computed through the transition matrix:

$$\Phi = \exp(\Delta t F)$$

That assumes F to be a constant matrix for small time intervals ($\Delta t$).

The predicted state vector computed through numerical methods for resolving the differential equations shown above and the predicted covariance is computed through the multiplication of the transition matrix with the previous known covariance matrix and the process noise matrix ($Q_{k-1}$):

$$P_k^- = \Phi_k P_{k-1}^+ \Phi_k^T + Q_{k-1}$$

Once the prediction has been performed (through solving the navigation equations), and provided an observation update, the KF gain is:

$$K_k = P_k^- H_k^T [H_k P_k^- H_k^T + R_k]^{-1}$$

And the corrected estimated state variables and covariance matrix:

$$X_k^+ = X_k^- K_k [Z_k - H_k h_k (X_k^-)]^{-1}$$

$$P_k^+ = P_k^- - K_k H_k P_k^-$$

R is the measurement noise matrix and Q the process noise matrix that need to be adjusted and tuned for a possible realization of the invention. The high fidelity model is used in the measurement prediction that are also required to generate the Jacobian matrix (Extended Kalman Filter). The use of Galileo signal affects the Jacobian differently than, helping to improve filter stability. Furthermore the tracking is performed on the carrier errors, thus as long as it is kept under the GNSS signal wavelength the KF will be able to operate normally. The tracking of the code contributes to a more robust tracking and in case the phase carrier tracking is lost, due to, for example, excessive noise, it can still be possible to keep the code tracking as so the KF is prepared for such possibility.

In this description the equivalent noise bandwidth of the filter is now intrinsically and optimally adjusted by the KF and not the PLL and DLL filters, thus depending on the KF implementation and also the measurement models employed within.

Since optimum lock detectors are very important to minimise the time between a signal lock loss and a loss of lock alert, and therefore, to reduce the re-acquisition times and to increase the availability of navigation, a different type of lock detector is required to allow operating in scenarios where the incoming signal strength is below the usual, only possible in the highly integrated receiver. For this a lock detector using the VE-VL part of the invention.

The VE-VL lock detector compares the Prompt correlator output with the VE-VL correlator outputs, to decide if signal is present. The main advantage of this method is that, after convergence is achieved, the signal power is compared with a noise-only reference. Thus, the reference noise floor can be estimated more precisely than for other classical techniques. Let Ii and Qi be the real and imaginary parts of the corresponding correlator output. The wide-band power of the k measurement, WBP(k), computed over M samples is given by:

$$WBP_k = \left( \sum_{i=1}^{M} (I_i^2 + Q_i^2) \right)_k$$

The decision criterion is based on comparing the WBP values of the Prompt output with the WBP values of the VE-VL output multiplied by a constant (KTH).

The demodulator 110 is responsible for detecting and demodulating navigation data bits and also by the wipe-off of the changes in signal due to bit transition so these do not affect the Hi-Gi navigator operation.

The Hi-Gi navigator comprises furthermore the integer fix and pre-processing component. The pre-processing applies corrections to account for errors due to satellite to user signal propagation such as ionosphere using navigation data for that purpose. The navigation data is transmitted by the GNSS satellites and therefore can be obtained either internally by the terminal or provided externally by some system communicating with the receiver. This data can be in the case of GPS DGPS and in the case of Galileo local elements providing differential corrections or other type of aiding data. Additionally the pre-processing module could also perform smoothing of code with carrier phase. The integer fix function is required since in some cases the KF may not be able to track the incoming signal and therefore the measurements of carrier phase can be contaminated in an unknown error that requires to be fixed using widely know methods.

In this description the INS and the GNSS data are highly integrated allowing enhanced navigation performance, in the sense that the GNSS I and Q data are processed in the same filter where the inertial sensor is. The INS is implemented within the KF, where the numerical integration of inertial raw data occurs and numerically solving the differential equations integrated within the inertial navigation equations. This requires the inclusion of a model of the inertial sensor that includes parameters such as drift, bias and misalignment which are also an output of the KF. As soon at the state vectors are updated, by accumulating the successive epoch of the outputs of the filter, it is possible to determine the relative user-satellite dynamics that is used to feedback to the code and carrier tracking. In order to determine satellite positions and velocity, the Hi-Gi requires navigation data. When the lock detector signals a loss of lock, the feedback signal is computed even without GNSS data, relying only on inertial sensor, thus still aiding the code tracking.

The detailed descriptions provide before can be implemented in as software computer program that can be subsequently stored and run on any computer device able to operate at the required high rates of the GNSS tracking stage, as example at 250 Hz.

The invention is limited by the allowed claims and therefore the before provided description should be regarded as illustrating the essentials that may be applied in different possible embodiments.

The invention claimed is:

1. A highly integrated GPS, Galileo and inertial navigation system for enhanced navigation in low signal strength, high dynamics or other GNSS or INS harsh environments, comprising:
   a Coupled Antenna (101) that provides data from the GNSS antenna and from the inertial measurement unit (IMU), where data from the first is provided to a Radio Frequency Front-End (RF-FE) and the second to the navigator, where the GNSS antenna is able to receive data from GPS and Galileo satellites and is integrated with the IMU in the same casing;
   a RF-FE 102 that performs the acquisition and pre-processing of the signal transmitted by the satellite before it is passed to the phase rotation module (103);
   a module (104) with a code acquisition algorithm to allow start of the tracking of the GPS and Galileo signals by providing the initial carrier phase and code;
   a module (103) with a phase rotation function to allow tracking of the incoming signal's carrier phase and frequency;
   a local code generator (105) to allow generating local code replica to allow tracking of the incoming signal code phase, that is affected by different fixed delays to generate the Very-Early, Early, Prompt, Late and Very-Late replicas;
   a multiplier (106) to generate a signal that will allow to correlate the local code with the incoming code;
   a set (107) of integrate and dump functions to allow performing the correlation;
   a data demodulator (110) to provide navigation data bits using the different local code replicas and to perform the wipe-off of such data;
   a lock detector function (108) for detecting signal GNSS outages and communicate the event to a navigator (109);
   a navigator (109) for determination of the navigation solution, using the GNSS data including I and Q signals when such is available and inertial sensor data to provide the necessary corrections to track the incoming GNSS signal or to keep aligned the internal local code replica during GNSS signal outages, seamlessly combined in a single filter using an accurate correlator model that relates code, phase and frequency errors, allowing the highly integrated navigation system to operate under the harsh environments;
   an interface to receive navigation data from an external system, if such is available;
   an interface in order to receive data from a reference station for navigation purpose, if such is available.

2. The system of claim 1, wherein the navigation solution comprises at least one of: position, velocity and attitude.

3. The system of claim 1, wherein the integrate and dump output consist of I and Q data for Very-Early, Early, Prompt, Late and Very-Late for GNSS in general, GPS or Galileo.

4. The system of claim 1, wherein navigation data comprises at least one of: satellite ephemeris; corrections for GNSS signal propagation; clock corrections; navigation data validity information.

5. The system of claim 1 is furthermore comprised by different channels, each allocated to different satellite and frequency, having as inputs the RF-FE (102) data, where each channel included the following modules:
   code acquisition (104), phase rotation (102), multipliers (106), local code generator (105), integrate and dump (I&D) (107), lock detectors (109) and navigation data demodulator (110).

6. The navigation system of claim 1 wherein the navigator (109), further comprises:
   a pre-processing function to apply corrections supplied in the navigation data that may also include functions such as smoothing of code with phase, ionospheric, tropospheric and satellite clock corrections;
   a dedicated integer fix algorithm to allow solving possible integer ambiguities in the tracking of the carrier phase;
   a Kalman Filter that combines the IMU and GNSS data using ultra-tight integration to determine the navigation solution as well as the carrier phase and frequency and code and estimates used in the tracking of GNSS signals.

7. The system of 6, wherein the Kalman Filter module comprises:
   an accurate correlator model that relates I and Q data raw measurements with code, phase and frequency error and with the position and velocity errors and that considers the integration time of the integrate and dump, discarding the need of a phase discriminator and seamlessly integrated with a set of navigation algorithms, using a code discriminator and inertial sensor data, whereby the correlator model employed provides an unique relation with receiver raw measurements of I and Q data with the actual navigation solution, providing a highly integrated navigation solution;
   a code discriminator to determine the error between the estimated code and the incoming one using normalised Early and Late I and Q measurements;
   a state vector comprising position errors such as, velocity, clock, attitude and inertial sensor;
   a function for determination of satellite-user distance and velocity using the navigation data based on satellite ephemeris data and navigation solution, communicating results to the GNSS tracking stage.

8. The system of claim 7, wherein the KF navigation algorithms comprise:
   functions for simultaneous tracking of errors of code, carrier phase and frequency with robustness to allow code only tracking even without tracking phase;
   functions for prediction of the incoming carrier phase, frequency and code errors used in the prediction of I and Q data used within the Kalman Filter;
   generator of partial derivatives for the carrier phase using the accurate correlator model, where each decomposition use the internal estimates of carrier phase and frequency used to control the error growth of the filter and making use of the best estimate available of the position and velocity;

generator of partial derivatives for the code carrier phase using the autocorrelation functions and the correlator error functions and using the internal estimates of code to control the error growth of the filter and making use of the best estimate available of the position and velocity.

9. The system of claim 7, wherein the accurate correlator model comprises:
   exact model of the outputs of the correlators I and Q data, also termed before as correlator models, by considering the effects of the carrier phase and frequency and code errors as well as the integration time, to allow increasing integration time of GNSS signals including Galileo pilot signal and accurately relating such errors with the navigation solution, avoiding use of conventional pre-processing functions of the correlator data on the carrier phase data and allowing a highly integrated navigation solution;
   technique that allows to accurately relate the correlator output I and Q data with the error of code and carrier phase and frequency and consequently with the navigation solution, within the Kalman Filter, consisting of the multiplication of two exponential modeling terms used in the prediction of I and Q data and allowing to close the loop of the navigation filter with the correlators.

10. The system of claim 1, wherein the lock detector comprises:
    a comparator of Prompt with the output the remaining correlators to decide is signal is present, where the signal power is compared with a noise-only reference.

11. The system of claim 1, wherein the Coupled Antenna comprises:
    a single case containing GNSS and IMU sensor to reduce as much possible any discrepancies that may affect tracking of the code phase and carrier phase and frequency in ultra tight coupling.

* * * * *